US008849923B2

(12) United States Patent
Halle et al.

(10) Patent No.: US 8,849,923 B2
(45) Date of Patent: Sep. 30, 2014

(54) METHOD AND OBJECT FOR EXTRACTING CONTENT HAVING A COMMERCIAL ASPECT FROM A MESSAGE EMITTED IN A RADIOCOMMUNICATION NETWORK

(75) Inventors: David Halle, Toulon (FR); Christophe Foesser, F-La Ciotat (FR); Lionel Mallet, Marseilles (FR); Frédéric Faure, Cassis (FR); Alain Brun, Aubagne (FR)

(73) Assignee: Gemalto SA, Meudon (FR)

( * ) Notice: Subject to any disclaimer, the term of this patent is extended or adjusted under 35 U.S.C. 154(b) by 931 days.

(21) Appl. No.: 12/679,804

(22) PCT Filed: Sep. 25, 2008

(86) PCT No.: PCT/EP2008/062866
§ 371 (c)(1),
(2), (4) Date: May 21, 2010

(87) PCT Pub. No.: WO2009/040402
PCT Pub. Date: Apr. 2, 2009

(65) Prior Publication Data
US 2010/0287248 A1 Nov. 11, 2010

(30) Foreign Application Priority Data
Sep. 25, 2007 (EP) .................................. 07301392

(51) Int. Cl.
*G06F 15/16* (2006.01)
*H04L 29/08* (2006.01)
*G06Q 30/02* (2012.01)

(52) U.S. Cl.
CPC .............. *G06Q 30/02* (2013.01); *H04L 67/306* (2013.01); *H04L 67/20* (2013.01); *H04L 67/04* (2013.01); *H04L 67/22* (2013.01)
USPC .......................................... 709/206; 709/204

(58) Field of Classification Search
USPC .................................. 709/204, 206, 224, 203
See application file for complete search history.

(56) References Cited

U.S. PATENT DOCUMENTS

| 7,653,401 | B2 * | 1/2010 | Qu et al. ........................ 455/466 |
| 2002/0077899 | A1 * | 6/2002 | Kaneko et al. .................. 705/14 |
| 2003/0018524 | A1 * | 1/2003 | Fishman et al. ................ 705/14 |

(Continued)

FOREIGN PATENT DOCUMENTS

| FR | 2 875 922 A | 3/2006 |
| WO | WO 03/003149 A | 1/2003 |

OTHER PUBLICATIONS

International Search Report (PCT/ISA/210) for PCT/EP2008/062866 dated Apr. 6, 2009.

*Primary Examiner* — Wing F Chan
*Assistant Examiner* — Andrew Woo
(74) *Attorney, Agent, or Firm* — Buchanan Ingersoll & Rooney PC

(57) ABSTRACT

In order to broadcast a commercial content corresponding to the centers of interest of a user of a communicating object, the disclosed method involves generating a message including at least one piece of commercial content associated with at least one piece of meta-information characterising the subject concerned by the commercial content. The method is implemented by the object for extracting a piece of commercial content from the message only if the piece of meta-information of the content corresponds to a piece of meta-information characterising a center of interest of the user.

10 Claims, 1 Drawing Sheet

(56) References Cited

U.S. PATENT DOCUMENTS

Figure 1:
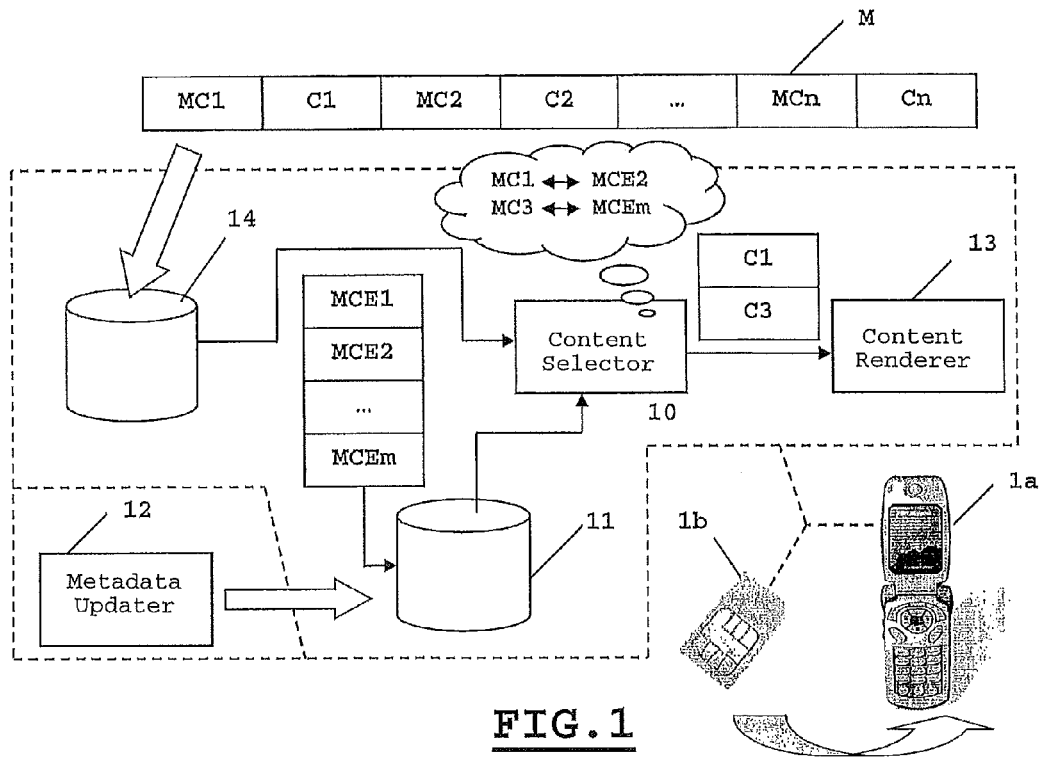

| | | |
|---|---|---|
| 2005/0043060 A1 | 2/2005 | Brandenberg et al. |
| 2007/0060099 A1* | 3/2007 | Ramer et al. .................. 455/405 |
| 2007/0283273 A1* | 12/2007 | Woods .......................... 715/738 |
| 2007/0293198 A1* | 12/2007 | Sanmugasuntharam et al. .......................... 455/414.1 |
| 2008/0058015 A1 | 3/2008 | Boussoukaia et al. |

\* cited by examiner

METHOD AND OBJECT FOR EXTRACTING CONTENT HAVING A COMMERCIAL ASPECT FROM A MESSAGE EMITTED IN A RADIOCOMMUNICATION NETWORK

The invention relates to a method, an object, for extracting a content having a commercial aspect from a message emitted from a data downloading server, through a preferably radiocommunication or wire network (ADSL type, specialised connection). Said message is intended for portable communicating objects for example in a radiophonic network. More particularly, the communicating objects are chip cards, such as SIM (Subscriber Identity Module) cards, introduced into radiophonic terminals. The invention could however be applied to other fields such as cellular televisions or any other application wherein the operator of a network wishes to broadcast commercial messages using a network he/she is operating. The invention further relates to a method for drawing up a message containing commercial contents.

The data downloading server, also called an OTA (Over The Air) card management platform includes software which makes it possible for the operator managing the radiocommunication network to preserve the control of chip cards in cellular terminals and to change the content thereof. Such operations are at the operator's initiative (push mode) and concern for example the downloading of a file in predetermined cards of the fleet managed by the operator, or the downloading or erasing of a determined application or the modification of data in a file, or of a determined application in operator-controlled cards, or broadcasting advertisements.

The data to be downloaded into the chip cards are often transmitted through a short messages server. Several short messages are often necessary to download an application or a file.

The invention more particularly concerns the management of a campaign downloading data with a commercial aspect to massively address user cards through the OTA data downloading server.

The operator currently has two possibilities for downloading advertisements from the OTA server.

According to a first solution, the operator carries out only one (so-called large) campaign intended to the whole fleet of the cellular radiophonic terminals. This solution sometimes leads to deploying messages containing non-targeted adverts to all the subscribers, adverts which are not efficiently taken advantage of, since they do not correspond to the expectations or centre of interests of said subscribers. Further, the so-called large downloading campaigns make it possible to reach 60% of subscribers on average (their phone being "under cover", which means accessible at the moment of the execution of the campaign).

According to a second possibility, the operator decides to consult his or her Customer Relationship Management Centre—CRM to determine the groups of subscribers having certain common characteristics. For each group thus constituted, the operator triggers targeted messages downloading campaigns intended to said subscribers. This solution is expensive as regards resources for the operator and still has little efficiency. As a matter of fact, the granularity of the centres of interest within the group is coarse. This can also lead to a certain saturation of the network, more particularly the centres of management of short messages (SMSC) because of the multiplication of campaigns.

The invention aims at remedying the drawbacks of the present solutions by making it possible to deploy a large (non-targeted) campaign which is thus not very expensive but is simple to implement either by performing a fine extraction of the contents with a commercial aspect corresponding to the centres of interest of each subscriber through the implementation of a method of extraction at the level of the cellular telephone, preferably at the level of the SIM card.

For this purpose, a communicating electronic object is provided which is adapted to receive through a communication network a message including at least one commercial content and at least one piece of meta-information associated to said commercial content to characterise the subject which the commercial content concerns, with the object being characterised in that it includes:

means for taking advantage of at least one piece of meta-information defining a centre of interest of a user;

means for extracting from the message a commercial content if and only if a piece of meta-information characterising the commercial content corresponds to a piece of meta-information defining a centre of interest of the user.

According to a first variant, the electronic object further includes means for storing the or at least one piece of meta-information defining a centre of interest of a user of the object and means for accessing said at least one stored piece of meta-information.

In one embodiment, the communicating electronic object is in fact a cellular terminal of a radiophonic network. In another embodiment, the object is a SIM card introduced into the cellular terminal in a radiophonic network or more generally an electronic device 1b connected to a terminal.

The electronic object may further include means for establishing said at least one piece of meta-information defining a centre of interest of the user by taking advantage of, for example, the characteristics of the user's subscription or the favourites defined by the user during the browsing phases through menus provided by the communicating object.

According to a second variant, the object further includes means consuming commercial contents to activate means for extracting a commercial content for carrying out a visual, sound, olfactory, tactile and/or gustatory function or a function for storing said extract content.

According to a third variant, the object includes means for storing the messages.

A method is also provided for extracting commercial contents delivered in the form of a message including at least one commercial content, at least a piece of meta-information associated with the commercial content for characterising the subject concerned by the commercial content, with the method being characterised in that it further includes the steps of:

collecting a piece of meta-information from a commercial content of the message;

comparing said piece of meta-information to at least one piece of meta-information defining a centre of interest of a user;

extracting from the message and then delivering a commercial content if and only if a piece of meta-information characterising the commercial content corresponds to a piece of meta-information defining a centre of interest of the user.

According to the invention, the method of extraction can be implemented by an electronic object such as described beforehand.

According to the invention, is further provided a method for establishing a message including at least a commercial content characterised in that it includes a step of adding to the message at least a piece of meta-information per commercial content for characterising the subject concerned by said content.

Figure 2:
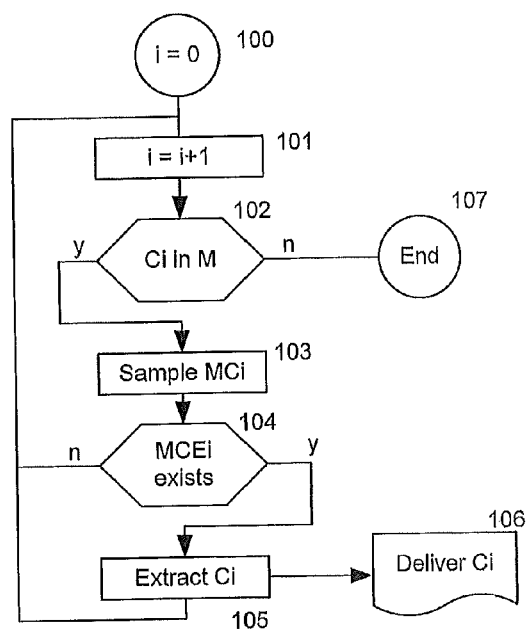

Other characteristics and advantages will appear more clearly upon reading the following description and examining the figures appended wherein:

FIG. 1 shows the functional architecture of a communicating electronic object according to the invention;

FIG. 2 describes the steps of a method for extracting a commercial content according to the invention.

Although the invention has been described according to preferred embodiments while referring to a radiocommunication network between a radiophonic server terminal and a fixed network of the radiophonic network, the method according to the invention can be implemented in any electronic object used by a user or subscriber for which an operator wishes to cause in said user an action further to a commercial message connected with one of the centre of interest thereof.

In FIG. 1, a message M includes a set of commercial contents C1, C2, . . . , Cn. According to the invention, this message is enriched according to a method, wherein to each considered commercial content is/are associated one or several pieces of meta-information to characterise the subject which said content concerns. Then, it is possible to characterise with the meta-information "mountain" a commercial content relating to mountain trekking clothes. It is also possible to associate another piece of meta-information such as "climbing" or even "snow" if it is desired to preferably target the fans of high mountain trekking clothes.

Similarly, in the summer, a piece of meta-information "sea" or "sail" may characterise a commercial for bathing suits or accessories for windsurfers.

In connection with FIG. 1, and as an example and in a non-limitative manner, the pieces of meta-information MC1, MC2, MCn respectively characterise the content C1, C2 and Cn. Within the scope of the invention, a message drawn up according to the method claimed is further broadcast for example using an OTA (Over The Air) platform by a radiocommunication network. The message is then transmitted without any distinction towards the whole fleet of the cellular radiophonic terminals, such as the object 1a. Preferably, the message is sent via the terminals to the subscription cards, so-called SIM (Subscriber Identity Module) cards such as 1b, the SIM cards being inserted into the terminals. A message M is transmitted for example using short messages. According to the invention, a communication object is provided which is adapted to read the message M. To optimise the impact of the commercial campaign, the commercial content must be targeted. According to the invention, it is useful to characterise the centres of interest of each one. Therefore, the object according to the invention has at least one piece of meta-information indicating a centre of interest. We can imagine that a subscriber and user of the radiophonic terminal could be particularly interested in sailing and music and even more precisely guitar. The pieces of meta-information "sail", "music" and "guitar" are thus pre-established (or determined as we shall see subsequently). Said pieces of meta-information characterising the centres of interest of the user are put at the disposition of the terminal or the SIM card. Such pieces of meta-information are referenced in connection with FIG. 1 by MCE1, MCE2, . . . , MCEm.

In the example illustrated in FIG. 1, the message more particularly includes the contents C1 and C3 for which the pieces of meta-information contained in the message correspond with the pieces of meta-information MCE2 and MCEm characterising the centres of interest of the user of the terminal 1a. Means 10 are capable of selecting the contents C1 and C3 among all the contents of the message M. As a matter of fact, the content C2 associated with the piece of meta-information MC2 has no equivalence or concordance in all the meta-information MCE1 to MCEm. The content C2 is thus ignored and not delivered. According to a first variant, the object 1a or 1b includes a memory 11 to store all the pieces of meta-information relating to the centres of interest of the user of the object 1a. According to another variant, the object 1a or 1b also includes means 13 consuming commercial contents. As a matter of fact, in order to be able to view the content on the screen of a terminal for example, or to listen to it, the means 13 provide the visual or sound rendering and can store the contents extracted by means 10 from a memory, the memory not being shown in FIG. 1. The means 13 can also have the function of activating the means 10 for extracting the contents of a message M. According to another embodiment, a message M can be previously stored using a memory 14 prior to being analysed by the extracting means 10. According to the invention, it is also possible to compose a bank of messages M prior to the extraction. It is also possible to make a bank of contents extracted prior to the viewing, listening to or more generally rendering thereof.

According to the invention, it is possible to define, upon the acquisition of the object by the user thereof, a list of the pieces of meta-information relating to the centres of interest of the user. It is also possible to pre-establish a list of pieces of meta-information relating to the solutions, products or services provided by the operator, so that, independently of the user's preferences, the commercial contents proper to the operator can be visualised or listened to. The list of such pieces of meta-information is pre-established and written into the memory 11 of the terminal 1a or preferably the chip card 1b.

Another possibility makes it possible to dynamically establish such list. Then, it is possible, at the level of the network (or even the CRM) or directly within the object according to the invention, to provide means 12 for updating the pieces of meta-information MCEm as a function of various parameters.

It can be considered for the means 12 to take advantage of the characteristics proper to the user's subscription or of the history or favourites further to the browsing phases carried out by the user of the object.

In a non-limitative way, it is provided, according to the invention, to draw up a message M, written in an XML language (eXtensible Markup Language) written as follows:

```
<?xml version="1.0" ?>
- <advertising>
- <!-- - Mountain related descriptor
-->
-<item>
- <tags>
- <tag>mountain</tag>
- <tag>climbing</tag>
- <tag>snow</tag>
- </tags>
- <!-- - Data format and encoding descriptor
-->
- <meta>
<format>b64</format>
<type>image/jpeg</type>
</meta>
- <data>
Data . . .
</data>
</item>
</advertising>
```

Pieces of meta-information "mountain", "climbing", "snow" illustrate a commercial content associated with one image in the jpeg (Join Photographic Experts Group) format.

The selection of the pieces of meta-information associated to the contents can be made with lexicons or result from agreements with advertisers supplying contents.

In reference to FIG. 2, a method for extracting according to the invention includes the following steps. In step 100, an index i is initialized to the value 0. Such index makes it possible to process the i commercial contents of a message M as shown in FIG. 1.

The index i is incremented by one unit at step 101. The method checks, at step 102, that the message includes a $i^{th}$ commercial content. If the message has been totally examined, the method ends at step 107. If the message includes at least one content Ci, the method consists in sampling the piece or pieces of meta-information MC1 associated with the content Ci at step 103. According to the claimed method, the method in 104 tests the compliance of MC1 with the pieces of meta-information MCE1 to MCEm describing the centres of interest of the user. If compliance exists, then the method extracts in 105 the content Ci and delivers it in 106. If, on the contrary, there is no compliance, then the method performs a new iteration in 101 to examine the following content.

The operation 104 can be materialised by a strict equality test between a piece of meta-information MCn characterising a content Cn and a piece of meta-information MCEm characterising a centre of interest. It is possible to perform a proximity test or synonym test instead. Then, it is possible for example to accept and extract a content dedicated to a football team (piece of meta-information MCn="football") if a piece of meta-information MCEn has the value "sport" or "soccer". Other compliance or proximity tests could be implemented in step 104.

Thanks to the invention, it is possible to remedy the drawbacks of the existing solutions by favouring large non-targeted campaigns while enabling a user to perceive (image, sound) only the commercial contents relating to his or her own centres of interest. The impact of the commercial content is thus optimised.

The invention is not limited to the downloading of data into chip cards of the SIM type or in cellular radiophonic terminals. One object according to the invention can also be a card included in a portable computer connected to a cellular terminal or a payment card or any other additional card included in a cellular terminal. According to other variants, the invention applies to other portable communicating electronic objects, such as communicating personal digital data assistants PDAs.

In other variants, the object is a chip card, a dongle or more generally an electronic device implementing an extracting method according to the invention. The subject can be connected with a terminal (such as a PDA or a portable computer or a telephone) which provides the functions of transmission towards the objects of messages M including commercial contents associated with pieces of meta-information MCn, the activation of the extraction using the object and the visual, sound or another rendering of the rendering of contents extracted by the object. The latter extracts the contents as a function of the pieces of meta-information describing the centres of interest of the user. Preferably, such an object includes means for storing said pieces of meta-information MCEm. Then, the user of a plurality of terminals can insert into or more generally connect the communicating object thereof with said terminals and receive only the commercial contents which are targeted on all the terminals. Each terminal broadcasts a targeted commercial to the user at the best of its capacities via its means consuming commercial contents. Thus, a terminal can, according to its capacities, implement a rendering other than a visual or a sound rendering. For example, it is possible to give a tactile rendering for blind users or even an olfactory or even a gustatory rendering. In another embodiment, such a terminal can store a plurality of messages M and transmit these to the object for an extraction on demand.

According to another example in compliance with the invention, the communicating object is a bank card connected with a payment or a withdrawal terminal. In this variant the bank card implements the method of extraction of commercial contents from a set of pieces of meta-information characterising the centres of interest of the holder thereof, pieces of meta-information are stored in the card, the payment terminal regularly receiving from the operator thereof messages containing non-targeted advertisement. During a payment or a withdrawal transaction, the holder of the card may visualise targeted advertisements via said terminal.

The invention claimed is:

1. A communicating electronic object for receiving, through a communication network, a broadcast message, said broadcast message including at least one commercial content and at least one piece of meta-information associated with said commercial content to characterize a subject which the commercial content concerns,
    wherein the object includes:
    establishment means for establishing a first piece of meta-information defining a center of interest of a user, the establishment means updating the first piece of meta-information based upon favorites defined by the user during at least one browsing phase of the user through at least one menu provided by the communicating electronic object;
    storage means for storing at least one established piece of first meta-information defining the center of interest of the user; and
    extraction means for extracting, from the broadcast message, the content if and only if a second piece of meta-information characterizing the content corresponds to a stored established first piece of meta-information defining the center of interest of the user.

2. A communicating electronic object according to claim 1, wherein said storage means includes means for accessing said at least one stored first piece of meta-information.

3. A communicating electronic object according to claim 1, wherein said communicating electronic object comprises a cellular terminal included within a radio-communication network.

4. A communicating electronic object according to claim 1, wherein said communicating electronic object comprises a SIM card configured to be introduced into a cellular terminal included within a radio-communication network.

5. A communicating electronic object according to claim 1, wherein said communicating electronic object comprises an electronic device connected with a terminal.

6. A communicating electronic object according to claim 1, wherein the establishment means updates the first piece of meta-information based upon characteristics of the user's subscription.

7. A communicating electronic object according to claim 1, further including consumer means for consuming commercial contents to activate the extraction means, wherein said consumer means perform a function of visual, sound, olfactory, tactile and/or gustatory, rendering or a function of storage of the extracted commercial content.

8. A communicating electronic object according to claim 1, further including means for storing broadcast messages received by said communicating electronic object.

9. A communicating electronic object according to claim 8, wherein the extraction means performs the extraction of the commercial content contained within a stored broadcast message.

10. A method for extracting commercial contents delivered in the form of a broadcast message broadcast through a communication network, the broadcast message including at least one commercial content, and at least one piece of meta-information associated with the commercial content for characterizing the subject concerned by the commercial content, wherein the method includes the following steps:

establishing a first piece of meta-information defining a center of interest of a user by updating the first piece of meta-information based upon favorites defined by the user during at least one browsing phase of the user through at least one menu provided by the communicating electronic object;

extracting a second piece of meta-information of the commercial content from the broadcast message;

comparing said second piece of meta-information to at least one first piece of meta-information defining the center of interest of the user;

extracting from the broadcast message and delivering the commercial content if and only if a second piece of meta-information characterizing the commercial content corresponds to a first piece of meta-information defining the center of interest of the user.

\* \* \* \* \*